US008675655B2

(12) United States Patent
Barri et al.

(10) Patent No.: US 8,675,655 B2
(45) Date of Patent: Mar. 18, 2014

(54) METHOD FOR DISTRIBUTING LOAD OVER MULTIPLE SHARED RESOURCES IN A COMMUNICATION NETWORK AND NETWORK APPLYING SUCH A METHOD

(75) Inventors: Peter Irma August Barri, Bonheiden (BE); Bart Joseph Gerard Pauwels, Tessenderlo (BE); Tom Edward Davis, Ontario (CA); Olivier Didier Duroyon, San Diego, CA (US); Chad William Kendall, Vancouver (CA); Predrag Kostic, Burnaby (CA); Robert Nesbitt, Vancouver (CA); Robert Elliott Robotham, Ottawa (CA)

(73) Assignee: Alcatel Lucent, Paris (FR)

( * ) Notice: Subject to any disclaimer, the term of this patent is extended or adjusted under 35 U.S.C. 154(b) by 3114 days.

(21) Appl. No.: 10/265,446

(22) Filed: Oct. 7, 2002

(65) Prior Publication Data

US 2003/0081608 A1    May 1, 2003

(30) Foreign Application Priority Data

Oct. 8, 2001    (EP) .................................... 01402582

(51) Int. Cl.
*H04L 12/28*    (2006.01)

(52) U.S. Cl.
USPC ............ 370/392; 370/408; 370/537; 709/225

(58) Field of Classification Search
USPC ......... 370/408, 230, 537, 235, 389, 392, 253, 370/401, 472, 252, 255, 381, 400, 422, 466
See application file for complete search history.

(56) References Cited

U.S. PATENT DOCUMENTS

| 5,884,297 | A | * | 3/1999 | Noven ........................ 370/395.3 |
| 5,953,329 | A | * | 9/1999 | Degges et al. ................ 370/351 |
| 6,035,200 | A | * | 3/2000 | Rockert ......................... 455/453 |
| 6,049,528 | A | * | 4/2000 | Hendel et al. ................. 370/235 |
| 6,314,465 | B1 | * | 11/2001 | Paul et al. ..................... 709/226 |
| 6,473,403 | B1 | * | 10/2002 | Bare ............................. 370/236 |
| 6,611,872 | B1 | * | 8/2003 | McCanne .................... 709/238 |
| 6,654,701 | B2 | * | 11/2003 | Hatley .......................... 702/122 |
| 6,768,716 | B1 | * | 7/2004 | Abel et al. .................... 370/230 |
| 6,778,495 | B1 | * | 8/2004 | Blair ............................. 370/230 |
| 6,909,713 | B2 | * | 6/2005 | Magnussen et al. .......... 370/389 |
| 6,934,249 | B1 | * | 8/2005 | Bertin et al. .................. 370/218 |
| 6,943,249 | B2 | * | 9/2005 | Ionescu et al. ................ 544/212 |
| 6,954,463 | B1 | * | 10/2005 | Ma et al. ....................... 370/401 |

(Continued)

FOREIGN PATENT DOCUMENTS

GB    2346302 A    8/2000
GB    2349296 A    10/2000

(Continued)

*Primary Examiner* — Ayaz Sheikh
*Assistant Examiner* — Mounir Moutaouakil
(74) *Attorney, Agent, or Firm* — Sughrue Mion PLLC

(57) ABSTRACT

The invention relates to a telecommunication network having IP packet-supporting capabilities, which includes a load distribution processing function, either centralized or distributed, by means of which a load distribution function may be applied to sets of paths between network nodes or sets of links of network trunks. The load distribution processing function handles different load distribution functions. Each of the different load distribution functions is associated to a different network input unit involved in the load distribution for a set of paths between network nodes or a set of trunk links. The invention also relates to a method of load distribution in a telecommunication network as summarized above.

14 Claims, 3 Drawing Sheets

(56) References Cited

U.S. PATENT DOCUMENTS

| | | | |
|---|---|---|---|
| 6,980,521 B1* | 12/2005 | Jarvis | 370/238 |
| 7,212,543 B1* | 5/2007 | Arwald et | 370/466 |
| 7,333,485 B2* | 2/2008 | Witkowski et al. | 370/389 |
| 2002/0038339 A1* | 3/2002 | Xu | 709/203 |
| 2002/0087717 A1* | 7/2002 | Artzi et al. | 709/236 |
| 2003/0031176 A1* | 2/2003 | Sim | 370/392 |
| 2003/0037142 A1* | 2/2003 | Munger et al. | 709/225 |
| 2005/0117562 A1* | 6/2005 | Wrenn | 370/351 |
| 2005/0243734 A1* | 11/2005 | Nemirovsky et al. | 370/252 |
| 2006/0018321 A1* | 1/2006 | Yamada et al. | 370/392 |

FOREIGN PATENT DOCUMENTS

| | | |
|---|---|---|
| GB | 2347325 A | 8/2001 |
| WO | WO 9913620 | 3/1999 |
| WO | WO 0072531 A1 | 11/2000 |

* cited by examiner

METHOD FOR DISTRIBUTING LOAD OVER MULTIPLE SHARED RESOURCES IN A COMMUNICATION NETWORK AND NETWORK APPLYING SUCH A METHOD

BACKGROUND OF THE INVENTION

1. Field of the Invention

The invention relates to a method for distributing load over multiple shared resources in a communication network and more particularly in a network having IP (Internet Protocol) packet-supporting capabilities. It also relates to a communication network applying such a method.

2. Brief Description of the Related Art

As known, the use of a method for distributing load over multiple shared resources is typically foreseen at two levels in a communication network, firstly for distributing the load over different paths in the network itself and secondly for distributing the load among links forming a trunk between two network nodes.

The bandwidth of a single transmission link in a network, as foreseen above, does not always suffice to carry all the traffic between a source node and a destination node and a distribution of the traffic load over different paths and/or links from the source to the destination nodes is then usually organized.

On the one hand, trunking is a known solution by means of which a traffic load transmitted between two nodes is divided between several transmission links associated according to selected distribution rules. The links behave as a single physical connection, with a same logical destination address, when they are associated and form a trunk between source and destination nodes. The IP traffic load forwarded from the source node to the destination node is balanced at a central level or at the level of the source by means of a load traffic processing function. Use for distribution purposes of a hashing method is a known solution.

On the second hand, multipath-balancing functions are known for spreading traffic streams of packets in a network according to their respective destinations. Typical applications of such balancing functions are for instance to support an equal cost multipath algorithm (ECMP) for traffic load spreading to underutilized links in a network having IP packet-supporting capabilities and/or to IP trunk groups which spread traffic load across multiple inter-node links.

A known multipath balancing function maintains packet order on a microflow level, being considered that a microflow represents a set of packets with common source IP address, destination IP address, IP protocol, source and destination ports, these ports being for instance TCP (transmission control protocol) ports. Such an order upkeep is important as it avoids packet reordering at their destination. Maintaining order for a set of packets with common source IP address (SRCIP) and destination IP address (DSTIP) suffices to maintain order on the corresponding microflow. Packet sets having respectively same SRCIP and same DSTIP corresponds to a determined flow and each packet of such a determined flow includes a same flow identifying key corresponding to a determined sequence of bits.

As known, the function of the equal cost multipath algorithm ECMP is to classify each packet into one of multiple paths, with all the packets of a same flow classified on a same path.

A known solution for performing a packet classification is based on a hashing function by means of which an identifying key which is a "N" bit number is reduced to an "M" bit number which is used as a path identifier, M being smaller than N with for instance N=64, M=3. Such a function is usually implanted at the level of a processing function and for instance in network processors at the level of the network ingress nodes for balancing source to destination traffic between several links, it is based on the source/destination addressing.

One simple hashing function is based on the extraction of the three most significant bits of the SRCIP address for obtaining a path identifier. But the results are identical for a large percentage of packets and induce unequal spreading across the available multiple paths, It is supposed here that an adequate level of granularity in the spreading function is obtained at the level of a backbone network having IP packet-supporting capabilities.

To avoid the above-indicated drawback and to exploit any difference in their respective keys between two flows, it is appropriate of considering all the bits in a key. The most common prior art solution apply an M-bit cyclic redundancy check (CRC) function to the key for obtaining a M-bit number, i.e. a path identifier, and the space covered by the M-bit output of the CRC function is divided into subspaces, with each subspace corresponding to one of the possible paths. When the output of the hashing function is a number falling in one of the subspaces, the corresponding packet is forwarded to the corresponding path, such for instance a "L" path for a subspace "L".

However, hashing functions do not work as efficiently as planned due to the fact that the input traffic load is not precisely predictable. For instance, if, in a network, some destination resources are more often addressed than others in a given traffic environment, there is a systematic and unbalanced distribution of traffic load over the destination resources that are shared.

This is illustrated on FIG. 1, for an element of a communication network having IP packet-supporting capabilities in which an ECMP load balancing is performed at the two outputs of four nodes 1, 2, 3, 4 of the tree structured part of the network element. These nodes are supposed to be cascaded through point-to-point L1 paths with a first output of node 1 linked to an input node 2, a first output of node 2 linked to an input of node 3 and a first output node 3 to an input of node 4. It is also supposed that the second output of node 1 is linked to an input of a node 5, the second output of node 2 to an input of node 6 and the second input of node 3 to an input of node 7. Being assumed that nodes 1 to 4 are provided with a same hashing function, all the flows forwarded from source node 1 to node 2 by means of a path L1 are transmitted from node 2 to node 3 by means of a second path L1 and from node 3 to node 4 by a third path L1. There will be no flow forwarded to node 6 from node 2 and from node 3 to node 7 by means of their respective path L2 and an unbalanced distribution of traffic load is systematically obtained.

To avoid such drawbacks, feedback loops are added to load balancing mechanisms to improve the use of shared resources, but they are complex to implement in a network with multiple distributed input network processors and they require remote load measurement means, feedback channels and internal traffic rearrangement functions to avoid out of sequence events in the traffic.

SUMMARY OF THE INVENTION

An object of the invention, therefore, is to provide a method for load distribution over multiple shared resources in a telecommunication network having IP packet-supporting capabilities and including a load distribution processing function which is either centralized or distributed and by means of which a load distribution function is applied to sets of paths between network nodes and/or sets of links of network trunks.

According to the invention, the load distribution processing function handles different load distribution functions, either at the central level of the load distribution function or at a distributed level according to the architecture chosen for the load distribution processing function, and each of the different load distribution functions is associated to a different network input unit involved in the load distribution for at least a determined set of paths between network nodes or a determined set of trunk links, an input node being for instance a network processor or a logical input port of a node. A suitable load traffic balancing is accordingly obtained due to a statistical compensation of the error, or unbalance, in load distribution made by one network processor by the errors made by other network processors with different load distribution functions.

According to the invention, the method involves the use of individual load distribution functions, each associated to a different network unit and each obtained by a different alteration of a same determined load distribution function.

According to a variant, the method involves the use of individual load distribution functions, each associated to a different network unit and each obtained by an input modification to a determined load distribution function.

According to a second variant, the method involves individual load distribution functions, each associated to a different network unit and each based on a different hashing function.

According to the invention, each individual load distribution function is optionally a programmable function.

According to a first embodiment, each different hashing function includes two main stages, a first stage in which an input key comprising N bits is mapped in a new number N' with the same number of bits, by means of a mapping function which is constant for a node and different for every node, and a second stage in which the new number N' is handled by a coding function and transcoded in an output key or path identifier M, with M<N, which is classified into one of alternate paths according to a M-bit space mapping.

The coding function is, for instance, a cyclic redundancy check function CRC.

A different primitive polynomial can be used for each of the different hashing functions.

A second object of this invention is to provide a telecommunication network having IP packet-supporting capabilities and including a load distribution processing function which is either centralized or distributed and by means of which a load distribution function is applied to sets of paths between network nodes and/or sets of links of network trunks According to the invention the nodes of the network comprise network input units at the level of which the load distribution function is taken in account or implemented for at least a determined set of paths between network nodes or a determined set of trunk links and in that a different load distribution function is affected to each of said network input unit.

Network input units corresponds to the network processors or to logical input ports in the network nodes.

BRIEF DESCRIPTION OF THE DRAWINGS

These and other objects, advantages and features of the invention will become apparent from the following description thereof taken in conjunction with the accompanying drawings.

DETAILED DESCRIPTION OF EXEMPLARY EMBODIMENTS

Figure 2:
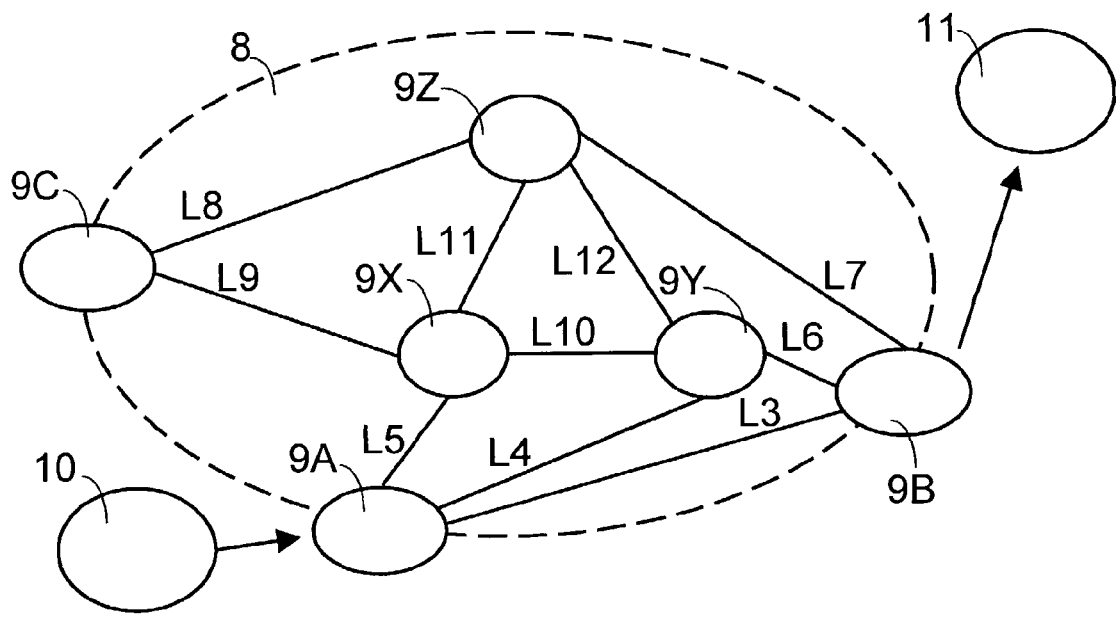
FIG. 2 is a simplified logical diagram of a known communication network having IP packet-supporting capabilities.

The traffic load distributing method according to the invention can be applied for instance to a telecommunication network 8 as illustrated on FIG. 2. Such a network comprises network units 9A, 9B, 9C constituting edge nodes and serving as ingress and/or egress routers, which are interlinked by means of other network units or nodes 9X, 9Y, 9Z acting as core routers.

The problem to be solved is how to distribute IP-packet traffic load over the available resources, i.e. over different paths in the network and/or between links of a same trunk between two network nodes.

This last case relates, for instance, to the IP-packet traffic collected at the level of an ingress network node, such as 9A, to be transmitted to receiving units linked to an egress network node, such as 9B. As known, such an IP-packet traffic comes, for instance, from sources, here considered as elements of a transmitting entity 10, to be transferred to receiving units, here considered as elements of a receiving entity 11.

Traffic load distribution is obtainable as soon as it exist several transmission paths available between two network nodes, such as for instance paths using link L3, or link L4 associated with link L6, or link L5 associated with links L10 and L6, when distribution between ingress network node 9A and egress network node 9B is considered.

Traffic transmission can be based, for instance, on the use of a destination resource identification selection function, which is implemented on an originating traffic source basis.

A plurality of outgoing links can be used for transmission purposes between an ingress or source node and an egress or destination node, such as, for instance, network nodes 9A and 9B. If it behaves as a single physical connection, it corresponds to a trunk, such a trunk 12 associating a plurality of links Lk1, Lkp−1 and Lkp, being illustrated on FIG. 3, this trunk corresponding for instance to link L3 on FIG. 2.

A load distribution processing function is necessarily included in the network, it can be centralized or distributed according to the needs and particularly according to the level to which it applies, i.e. to a determined set of paths in the network or to a determined set of links associated in a trunk between two network nodes. At least in the last case, it can be beneficial of having it distributed at the level of the network nodes and, for instance, of having individual load distribution functions implanted at the level of network input units. Such network input units are for instance the network processors which are included in the ingress nodes, they could also be other network elements and for instance physical or logical input ports at the level of a node.

Figure 3:
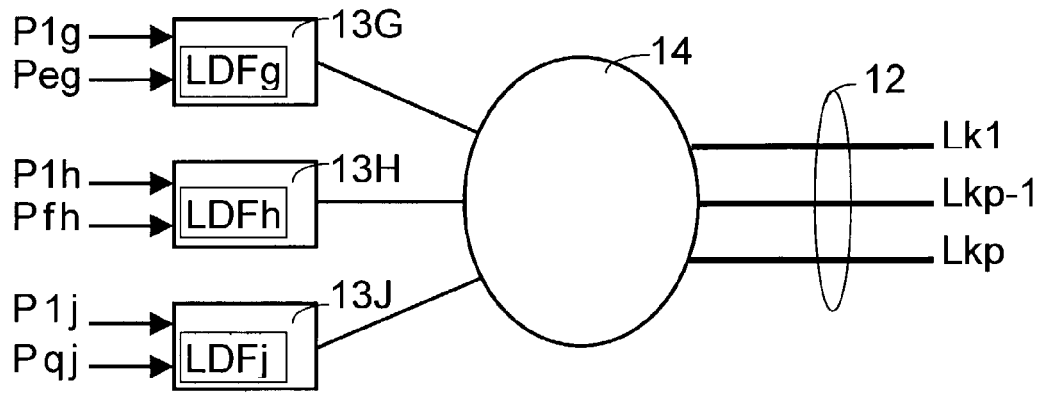
FIG. 3 is a simplified diagram relating to an example of ingress node as found in the network which is shown on FIG. 2.

In the embodiment which is illustrated on FIG. 3, an individual load distribution function is for instance implanted in each of the network input units respectively constituted by the network processors 13G, 13H and 13J included in the ingress node partly illustrated on FIG. 3, for traffic load distribution on the set of links corresponding to trunk 12.

An individual and different load distribution function, such as LDFg, LDFh or LDFj, can be associated, for instance, to every network processor which is itself physically or logically coupled to at least a physical and/or logical input port providing traffic at the level of an ingress node. Other associations are also foreseeable and, for instance, an individual load distribution function can be associated to an ingress blade, i.e. to the input ports relating to such a blade. A load distribution function can also be directly associated to a physical or logical input port which is providing traffic at the level of an ingress node.

In the example illustrated on FIG. 3, individual load distribution functions are associated to network processors 13G, 13H, 13J of the ingress node and these network processors are affected to the logical input ports of the node for distribution purposes over the set of outgoing links Lk1, Lkn−1, Lkn of trunk 12. Processor 13G is supposed, for instance, to be more specifically affected to the logical input ports P1g to Peg. As commonly found, these networks processors are connected, for this purpose, to the outgoing links of trunk 12 by switching elements of a switching fabric 14 with which they are associated in the node.

Differences between load distribution functions are obtainable, for instance, by different alterations of a same determined load distribution function. These different alterations are respectively linked to the different network input units of the network. In the example illustrated on FIG. 3, such differences are for instance obtained by a permutation of the links of a trunk for each of the network processors, such as 13G, which is concerned.

Another way to obtain differences between load distribution functions can also be obtained by means of different input modifications to a determined load function and for instance by modification to a key linked to a network input unit or an addition of information dependent of the network unit to such a key.

When network input units are other than network processors, they are physical or logical input ports of a node and a different load distribution function LDF is attributed to each physical or logical input port.

Use of different load distribution functions for different network input units induces practically a decorrelation of the load distribution errors and a statistical compensation of the errors, or unbalances is practically obtained.

Results corresponding to those which are obtained with a distributed load distribution processing function can also be obtained with a centralized architecture for this load distribution processing function, a different load distribution function being associated to each network input unit.

According to an embodiment of the present invention, the traffic load distribution insured by the load distribution functions are supposed to be based on source and destination address hashing.

Use of different hashing functions is one of the solutions, which are preferably applied according to the invention to obtain different load distribution functions.

According to a first solution, programmable hashing functions are implemented and they are organized to provide different results. Such programmable function is for instance, provided for per port or per blade, it can also be implemented per node or router.

For instance, hashing functions applying different rules are implemented to provide different results.

Figure 1:
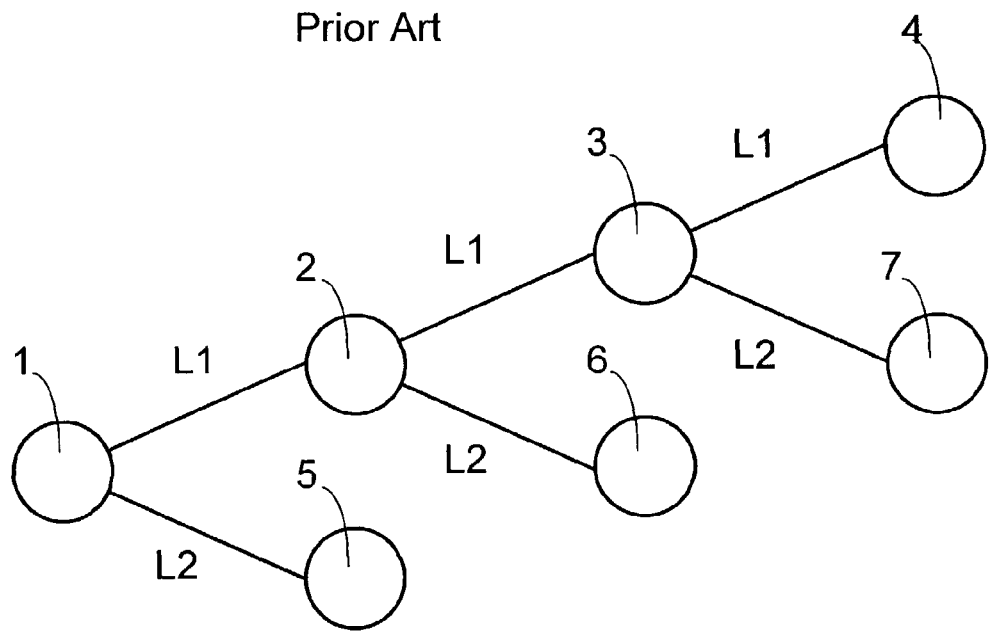
FIG. 1 is a simplified diagram relating to an example of load distribution in a communication network having IP packet-supporting capabilities according to prior art, as described above.

Applying a different hashing function at each node in an organization as foreseen in relation with FIG. 1 induces an uniform mapping of the IP-packet flows across the hashing output space at each node when the scenario is the same as indicated above in relation with said FIG. 1.

Figure 4:
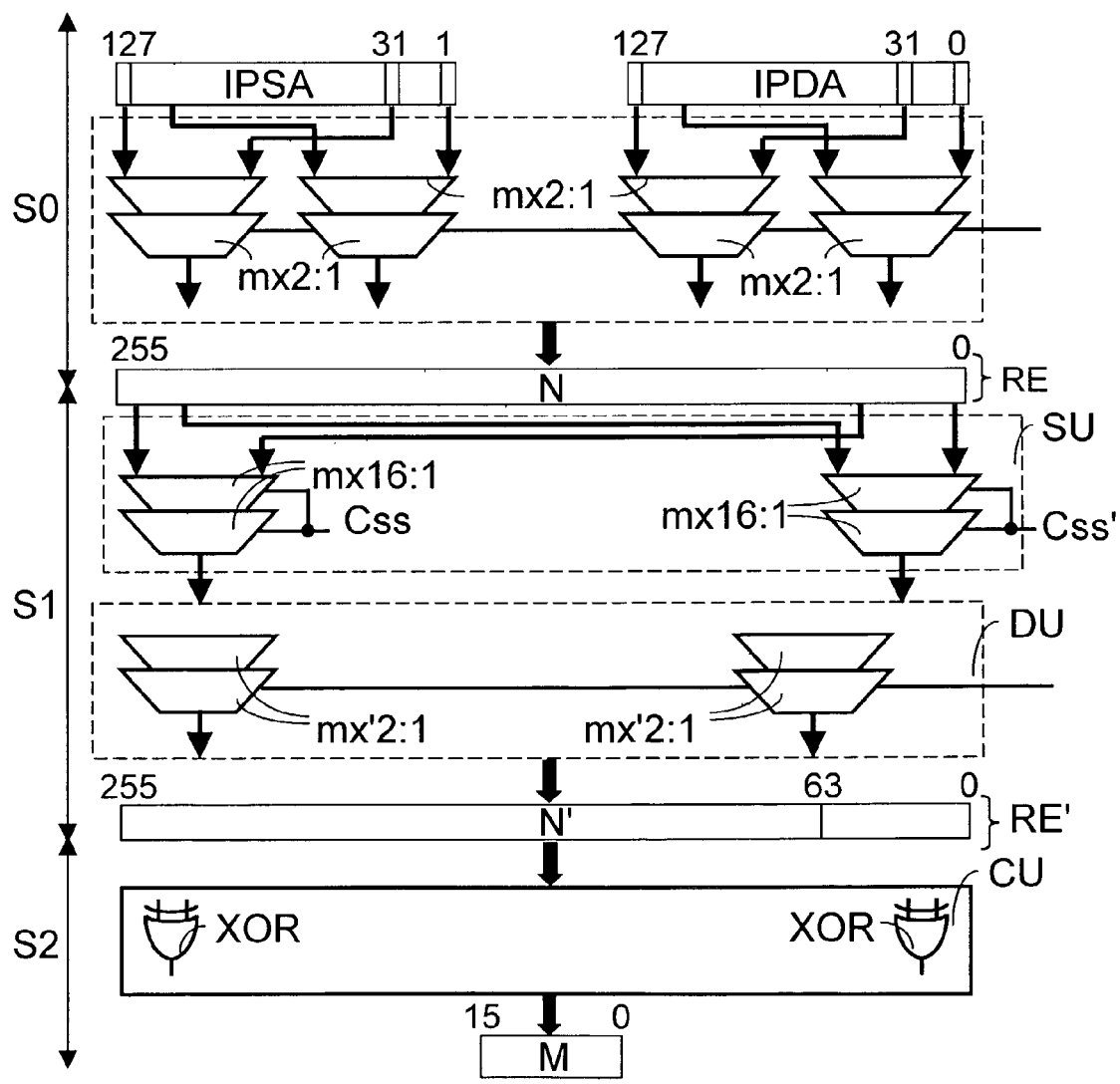
FIG. 4 is a schematic diagram relating to an example of an ECMP scrambling function for a processing unit applying the distribution method according to the invention.

According to a preferred embodiment, the hashing function includes two main stages, indicated as stage S1 and stage S2 on FIG. 4. In stage S1, an input key corresponding to a number of N bits, is inputted to be mapped in a new number N' of a same number of bits, by means of a mapping function. This mapping function is, on the one hand, a constant for a node and, on the other hand, different for each node. The inputted key which is referenced N on FIG. 4, is for instance a number made of two hundred and fifty six bits or 256-bit number and is transformed in a new key N' of same size.

In the following stage S2, the key corresponding to number N' is inputted to be handled by a coding function, such as a cyclic redundancy check CRC and it is transcoded in an output key, i.e. a path identifier, M which is for instance a number comprising sixteen bits. This path identifier M is classified into one of the alternate paths according to the 16-bit subspace mapping.

As illustrated on FIG. 4 for an example of a scrambling function designed for IP packet according either to Internet protocol versions 4 or 6, a preliminary stage S0 can be needed for receiving and storing temporarily data to be scrambled. As known such packets are sequences of data of variable length each packet being encapsulated within an IP header. N number is based on addresses, such as source SRCIP and destination DSTIP addresses, which are invariant between packets comprising a same flow. For IP packets according to protocol version 6, or iPv6, the parts IPSA and IPDA can be directly captured in a register, but for IP packets according to protocol version 4, or iPv4, the 128-bit parts IPSA and IPDA are split into nibbles.

Figure 5:
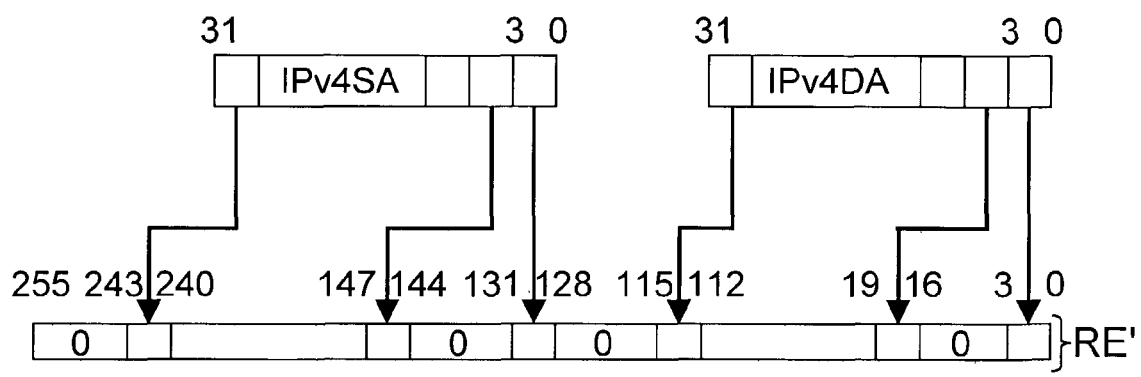
FIG. 5 is a logical block diagram relating to a nibble slicer for implementing the ECMP scrambling function illustrated on FIG. 4.
Figure 6:
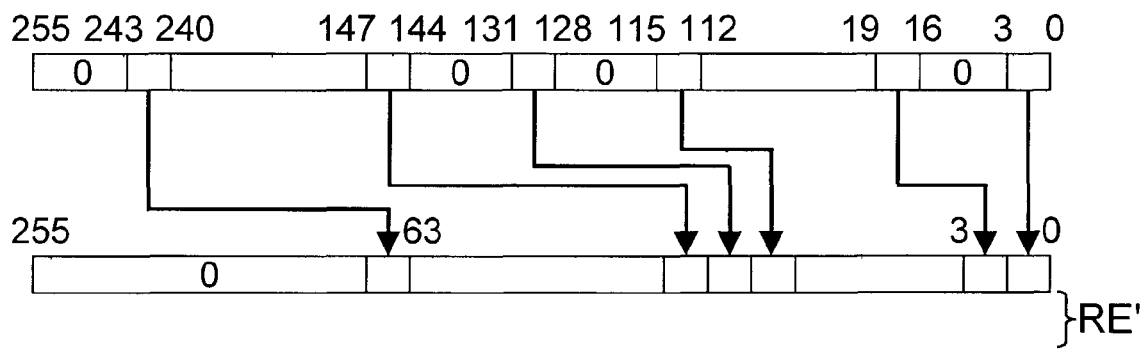
FIG. 6 is a logical block diagram relating to a nibble de-slicer for implementing the ECMP scrambling function illustrated on FIG. 4

For instance and as shown on FIG. 5, each nibble is mapped into the lower four bits of every 16-bit slice within the 256-bit end register RE in stage S0. The upper twelve bits of every 16-bit slice are filled with zeros. According to the embodiment shown on FIG. 4, sixty-two parallel stacks of four multiplexers m×2:1 are provided for, each multiplexer having two inputs and one output. The number of these multiplexers can be reduced to fifty six, by avoiding to set the upper twelve bits of every 16-bit slice to zero, as a simplest solution to obtain the same result can be applied at the level of the following scrambler stage S1.

To limit the scope of the scrambling function as used, an input slice corresponding to a set of sixteen contiguous bits is defined from the N number used as input key for stage 1 and an output key corresponding to a set of sixteen contiguous bits is obtained from the output key, or path identifier, of stage 2. Sixteen input slices and sixteen output slices are accordingly obtained if N corresponds to a 256-bit number. The sixteen input slices obtained from the parts IPSA, IPDA are scrambled between each other, using multiplexers m×16:1, each multiplexer having sixteen inputs and one output. A scrambling unit SU of sixteen groups of sixteen multiplexers m×16:1 is implemented according to this embodiment, each group having a common select signal, such as Css or Css'. Each multiplexer within a same group multiplexes the bits of same rank within the 16-bit slices, with for instance the multiplexer ranked 0 within each group multiplexing the bits at position 0 from all the 16-bit slices and so on. The sixteen groups of multiplexers m×16:1 require a configuration register, which is a sixty-four bits register in this embodiment, to define the scrambling function.

Each multiplexer m×16:1 inputs one bit extracted in a determined position from each of the 16-bit slices and outputs a single bit value which is the bit value of the input which is selected at the level of the multiplexer. The scrambling function per output slice can be configured at will by a preliminary programming. According to the invention, the mapping relates to a determined position, such as i, of all input slices to an output slice ranked i, instead of a simple mapping from an input slice ranked i to an output slice ranked i. Accordingly if there is a set of keys differing only in a localized area of the input key, the mapping function, according to the invention, spreads that area of difference over the entire output key and the entropy of the hashing output is improved.

A de-slicing of IPv4SA/IPvDA nibbles, is necessary after the scrambling stage. If the nibbles come from IPv4 parts, they are grouped into the lower sixty-four bits of 256-bit register RE', as shown on FIG. 5. Multiplexers m×2:1, with two inputs and one input, are associated in a de-slicing unit DU including sixty stacks of four multiplexers each in the embodiment which is foreseen here. The selection of the multiplexers to be used is made according to the IPv4 or Ipv6 packet type to be handled.

The contents of register RE' which is obtained is fed to a classifier unit CU. In an embodiment according to the invention, this classifier unit CU is a cyclic redundancy check (CRC) unit providing a M-bit number from the N' number that it receives from first stage S1. The result of the coding which is obtained from the 256-bit number N' is a 16-bit output key M, in the example of embodiment already stated above. This is for instance obtained by means of a classifier unit CU based on a parallel structure of exclusive XOR gates providing the 16-bit number M. Such a number M is used as a path identifier for the designation of a determined path among the N alternative paths at disposal. This path identifier is multiplied by N and the bits corresponding to upper $\log_2 N$ at the level of the result are typically used as index into a table of the alternative paths.

Analysis and experimentation lead to a primitive polynomial CRC-16 populated with roughly equal numbers of unity and zero coefficients spaced evenly over the polynomial.

Use of a different primitive polynomial at each node in the network is a solution available when a flexible CRC calculator is available, i.e. when each XOR function comprises its own select input and it avoids processing subsequent to the CRC function.

Use of rotation of the parts IPSA and IPDA before CRC by a configurable value is another available solution, it provides sixty-four different transformations when protocol IPv4 is in force.

Scrambling parts IPSA and IPDA before CRC by a configurable mapping is also acceptable, as it provides large transformation possibilities with $2.10^{87}$ transformations available, but it also requires a very large number of multiplexers and consequently is considered an ultimate solution, when the others are no more usable.

Scrambling the field of parts IPSA and IPDA in 16-bit blocks for inputting CRC function is another possibility. It generates different CRC for each node as long as the scramble solution is different for each node and it involves a relatively limited hardware, for instance 256 multiplexers with 16 inputs and one output.

To summarize the algorithm which is used in the method according to the invention, the first stage mapping function sets up N/M slices of M bits each, M being an integer and dividing equally into N. Each slice is obtained from bits of same rank, such as 0, M, 2M, . . . or 1, M+&, 2M+1, . . . in the N/M slices and corresponds to a different mapping input, it is transformed in a new M-bit value, by using a configurable mapping function preferably different for each slice. This function maps the value at each bit position within a mapping input to a generally different bit position in a mapping output. The mapping of bit values from input to output is one-to-one and the N/M M-bit mapping outputs are concatenated together in the new number N'.

This number N' is transformed in a L-bit number before being processed according to the second stage encoding function, if the L-bit number corresponding to the input key to the hashing function is smaller in size than the N-bit number at the input of the first stage.

A preliminary stage S0, if the input key of the hashing function is a L-bit number which is smaller in size than the input number N to the first stage, in order to map the L-bit of this input key into a N-bit input key as required by the first stage. This preliminary stage S0 involves a mapping function, which divides the N-bit number into N/K contiguous K-bit regions and the L-bit number of the input key into contiguous (L×K/N)-bit regions. The value from each (L×K/N)-bit region is copied into the lower bits of the corresponding K-bit region and the remaining high order bits of this K-bit region are filled with zeros.

The invention claimed is:

1. A method for load distribution over multiple shared resources in a telecommunication network having IP packet-supporting capabilities, said method comprising:
    performing a load distribution processing function which is either centralized or distributed and by means of which a load distribution function is applied to distribute network traffic among at least one set of multiple paths between a first network node and a second network node, or to distribute network traffic among at least one set of multiple links of a network trunk between the first network node and the second network node,
    wherein said load distribution processing function handles different load distribution functions, either at the central level of the load distribution function or at a distributed level, and
    wherein each of the different load distribution functions is associated to a different network input unit involved in the load distribution for the at least one set of multiple paths or the at least one set of multiple links of the network trunk.

2. The method according to claim 1, further comprising performing individual load distribution functions each associated to a different network unit and each obtained by a different alteration of a same determined load distribution function.

3. The method according to claim 1, further comprising performing individual load distribution functions, each associated to a different network unit and each obtained by a different input modification to a determined load distribution function.

4. The method according to claim 1, further comprising performing individual load distribution functions, each associated to a different network unit and each based on a different hashing function.

5. The method according to claim 1, wherein each individual load distribution function is a programmable function.

6. A method for load distribution over multiple shared resources in a telecommunication network having IP packet-supporting capabilities, said method comprising:

performing a load distribution processing function which is either centralized or distributed and by means of which a load distribution function is applied to at least one set of paths between network nodes and sets of links of network trunks; and performing individual load distribution functions, each associated to a different network unit and each based on a different hashing function, wherein said load distribution processing function handles different load distribution functions, either at the central level of the load distribution function or at a distributed level;

wherein each of the different load distribution functions is associated to a different network input unit involved in the load distribution for at least one of a determined set of paths between network nodes and a determined set of trunk links; and wherein each different hashing function includes two main stages, a first stage in which an input key comprising N bits is mapped to a new number N' with the same number of bits, by means of a mapping function which is constant for a node and different for every node, and a second stage in which the new number N' is handled by an encoding function and transcoded to an output key or path identifier comprising M bits, with M<N, said output key or path identifier being classified into one of alternate paths according to an M-bit space mapping.

7. The method according to claim 6, wherein the first stage mapping function sets up N/M slices of M bits each, M being an integer dividing evenly into N, each slice, obtained from bits of same rank in the N/M slices and corresponding to a different mapping input, being transformed into a new M-bit value, by using a configurable mapping function preferably different for each slice, said function mapping the value at each bit position within a mapping input to a generally different bit position in a mapping output, the mapping of bit values from input to output being one-to-one and in that the N/M M-bit mapping outputs are concatenated together in the new number N'.

8. The method according to claim 6, comprising a preliminary stage, wherein if the input key of the hashing function is an L-bit number which is smaller in size than the input number N to the first stage, in order to map the L-bit of this input key into a N-bit input key as required by the first stage, said preliminary stage performs a mapping function which divides the N-bit number into N/K contiguous K-bit regions and the L-bit number of the input key into contiguous (L×K/N)-bit regions, and which copies the value from each (L×K/N)-bit region into the lower bits of the corresponding K-bit region and which fills the remaining high order bits of this K-bit region with zeros.

9. The method according to claim 7, wherein the new number N' obtained from the first stage is transformed in an L-bit number before being processed according to the encoding function of said second stage, if the L-bit number corresponding to the input key to the hashing function is smaller in size than the N-bit number at the input of the first stage.

10. The method according to claim 6, wherein the coding function is a cyclic redundancy check function.

11. The method according to claim 6, wherein a different primitive polynomial is applied for each of the different hashing functions.

12. A telecommunication network comprising:
IP packet-supporting capabilities;
a load distribution processing function which is either centralized or distributed and by means of which a load distribution function is applied to distribute network traffic among at least one set of multiple paths between a first network node and a second network node, or to distribute network traffic among at least one set of multiple links of a network trunk between the first network node and the second network node;
wherein the network nodes further comprise network input units at the level of which the load distribution function is taken into account or implemented for the at least one set of multiple paths or the at least one set of multiple links of the network trunk, and a different load distribution function is associated to each of said network input units.

13. A telecommunication network according to claim 12, wherein the network input units comprise network processors included in the network nodes.

14. A telecommunication network according to claim 12, wherein the network input units comprise logical input ports of the network nodes.

* * * * *